United States Patent
Miyajima et al.

(10) Patent No.: US 12,461,371 B2
(45) Date of Patent: Nov. 4, 2025

(54) HEAD-MOUNTED DISPLAY AND VIRTUAL IMAGE FORMING LENS TO BE USED FOR THE HEAD-MOUNTED DISPLAY

(71) Applicants: National University Corporation Tokyo University of Agriculture and Technology, Fuchu (JP); Itoh Optical Industrial Co., Ltd., Gamagori (JP)

(72) Inventors: Yasushi Miyajima, Gamagori (JP); Yasuhiro Takaki, Fuchu (JP)

(73) Assignees: National University Corporation Tokyo University of Agriculture and Technology, Fuchu (JP); Itoh Optical Industrial Co., Ltd., Gamagori (JP)

( * ) Notice: Subject to any disclaimer, the term of this patent is extended or adjusted under 35 U.S.C. 154(b) by 665 days.

(21) Appl. No.: 17/791,736

(22) PCT Filed: Jan. 18, 2021

(86) PCT No.: PCT/JP2021/001443
§ 371 (c)(1),
(2) Date: Jul. 8, 2022

(87) PCT Pub. No.: WO2021/149628
PCT Pub. Date: Jul. 29, 2021

(65) Prior Publication Data
US 2023/0032859 A1    Feb. 2, 2023

(30) Foreign Application Priority Data
Jan. 23, 2020    (JP) ................. 2020-009320

(51) Int. Cl.
*G02B 27/00* (2006.01)
*G02B 27/01* (2006.01)
*G02B 27/14* (2006.01)

(52) U.S. Cl.
CPC ....... *G02B 27/0172* (2013.01); *G02B 27/144* (2013.01); *G02B 2027/0134* (2013.01)

(58) Field of Classification Search
CPC .............. G02B 27/0172; G02B 27/144; G02B 2027/0134; G02B 25/001; G02B 27/0075;
(Continued)

(56) References Cited

U.S. PATENT DOCUMENTS 5,543,816 A * 8/1996 Heacock ................ G02B 13/18
359/630
5,808,801 A * 9/1998 Nakayama ......... G02B 27/0172
348/E5.143
(Continued)

FOREIGN PATENT DOCUMENTS

CN    109407301 A    3/2019
DE    102014107938 A1 * 12/2015    ......... G02B 27/0172
(Continued)

OTHER PUBLICATIONS

Anonymous: "Aspheric lens" Wikipedia, Sep. 12, 2019, 7 pages. (cited in the Jan. 22, 2024 Search Report issued for EP21744814.1).
(Continued)

*Primary Examiner* — Mustak Choudhury
(74) *Attorney, Agent, or Firm* — Troutman Pepper Locke LLP; James E. Armstrong, IV; Joshua L. Jones

(57) ABSTRACT

Provided is a head-mounted display capable of expanding the range in which a user can clearly view images. A head-mounted display 1 includes a display device 3 to display images 3a and 3b for the left eye and the right eye on a screen 3c, and virtual image forming optical systems 4a and 4b for the left eye and the right eye respectively disposed with respect to the images 3a and 3b for the left eye and the right eye on the screen 3c, wherein the virtual image forming optical systems 4a and 4b have positive power set
(Continued)

in respective regions that visual lines of a user pass through, and include, at outer sides of optical centers in directions orthogonal to optical axes, power adjusting regions 55 having power set closer to the negative side than power at the optical centers.

13 Claims, 8 Drawing Sheets

(58) Field of Classification Search
CPC ...... G02B 2027/011; G02B 2027/0123; G02B 2027/0127; G02B 3/04; G02B 3/10; G02B 13/18
See application file for complete search history.

(56) References Cited

U.S. PATENT DOCUMENTS

| | | |
|---|---|---|
| 2014/0266990 A1 | 9/2014 | Makino et al. |
| 2017/0017085 A1 | 1/2017 | Araki et al. |
| 2020/0319478 A1 | 10/2020 | Miyajima |
| 2021/0011304 A1 | 1/2021 | Takaki et al. |

FOREIGN PATENT DOCUMENTS

| | | |
|---|---|---|
| JP | 2012-78670 A | 4/2012 |
| JP | 2018-84788 A | 5/2018 |
| WO | 96/18126 A1 | 6/1996 |
| WO | 2013/076994 A1 | 5/2013 |
| WO | 2015/137165 A1 | 9/2015 |
| WO | 2020/008804 A1 | 1/2020 |

OTHER PUBLICATIONS

Rolf R Hainich et al., "Near-Eye Displays" in "Displays : Fundamentals and Applications", CRC Press, Jul. 5, 2011, pp. 439-503. (cited in the Jan. 22, 2024 Search Report issued for EP21744814.1).

Yuta Yamaguchi et al., "Visual Fatigue Reducing 3D Glasses by Extending Depth of Field of Eyes", 3-5: Late-News Paper:, SID Symposium Digest of Technical Papers, vol. 50, No. 1, Jun. 29, 2019, pp. 17-19. (cited in the Jan. 22, 2024 Search Report issued for EP21744814.1).

Supplementary European Search Report mailed Jan. 22, 2024, issued for EP 21744814.1.

International Search Report mailed Apr. 6, 2021, issued for PCT/JP2021/001443 and English translation thereof.

Notice of Reasons for Refusal drafted May 10, 2023, issued for JP2021-572714 and English translation thereof.

\* cited by examiner

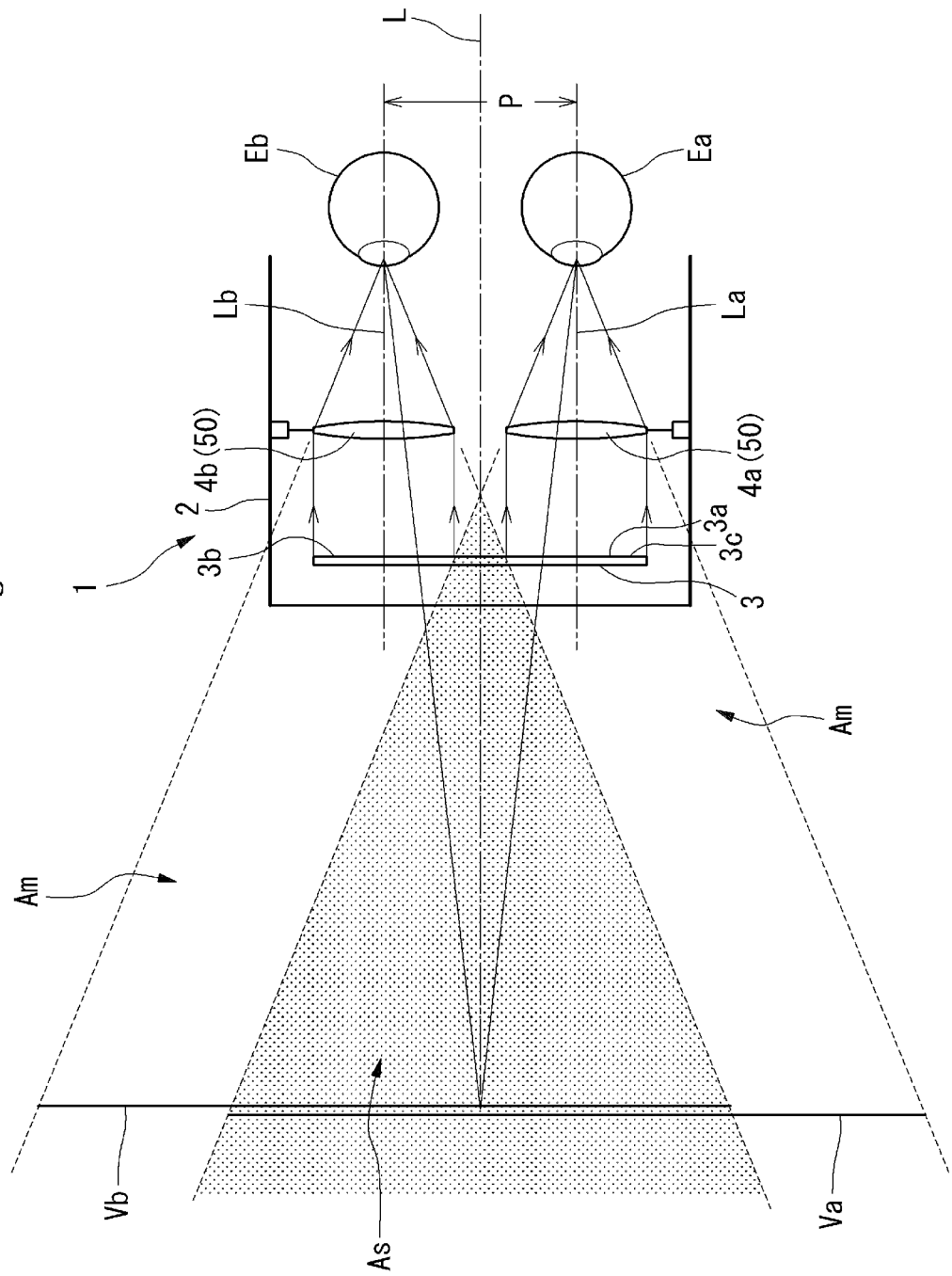

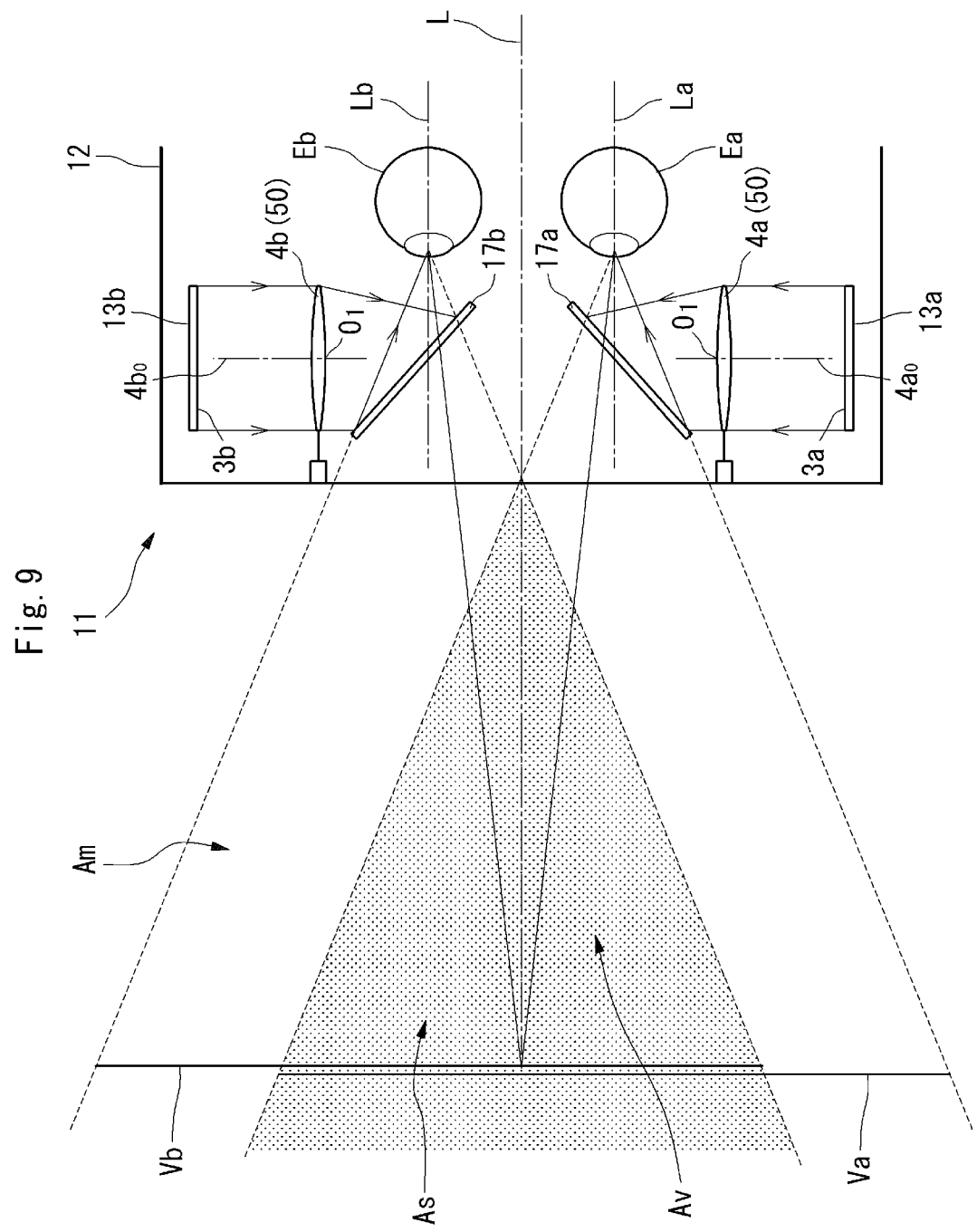

HEAD-MOUNTED DISPLAY AND VIRTUAL IMAGE FORMING LENS TO BE USED FOR THE HEAD-MOUNTED DISPLAY

TECHNICAL FIELD

The present invention relates to a head-mounted display that displays stereoscopic images to a user, and a virtual image forming lens to be used for the head-mounted display.

BACKGROUND ART

In recent years, research and development on virtual reality (VR) technology and augmented reality (AR) technology have progressed, and use of these technologies in fields ranging from professional fields including medical and design fields to general consumer fields including game and entertainment fields are expected. In VR technology and AR technology, a head-mounted display (HMD) that is a display device to be worn on the head is used (for example, refer to Patent Literature 1).

A head-mounted display includes a display device that displays images for the left eye and the right eye on a screen, and displays stereoscopic images to a user by displaying parallax images corresponding to the left and right eyes on the screen of the display device. This stereoscopic display method in which parallax images corresponding to the left and right eyes are displayed is called binocular stereoscopic display.

CITATION LIST

Patent Literature

Patent Literature 1: WO 2015/137165 A

SUMMARY OF INVENTION

Technical Problem

In a head-mounted display, in order to provide a highly immersive experience to a user, images with a wide angle of view are displayed. Therefore, it has been desired to enable a user to clearly view images displayed on a screen not only when viewing the images from a front view but also when viewing the images from a lateral view.

Based on the circumstances described above, an object of the present invention is to provide a head-mounted display capable of expanding the range in which a user can clearly view images, and a virtual image forming lens to be used for the head-mounted display.

Solution to Problem

The present invention was made in view of the problems described above, and a first aspect thereof is set forth as follows.

A head-mounted display set forth in a first aspect includes a display device to display images for the left eye and the right eye on a screen, and virtual image forming optical systems for the left eye and the right eye respectively disposed with respect to the images for the left eye and the right eye on the screen, wherein the virtual image forming optical systems have positive power set in respective regions that visual lines of a user pass through, and include, at outer sides of optical centers in directions orthogonal to optical axes, power adjusting regions having power set closer to the negative side than power at the optical centers. Here, the outer sides in the directions orthogonal to optical axes are directions separating from the optical axes in the directions orthogonal to optical axes of the virtual image forming optical systems.

In a head-mounted display, virtual image forming optical systems with predetermined power set positive for obtaining virtual images (magnified upright images) of images for the left eye and the right eye displayed on a display device are used. In a general head-mounted display, for these virtual image forming optical systems, spherical design lenses or aspherical lenses with constant power are used, so that, in the case of the lateral view in which a distance from the eye of a user to the screen of the display device is greater compared to the case of the front view, the gap between the position of the screen of the display device and the focal position where the user can clearly view images increases, and resolution of images that the user views becomes lower.

On the other hand, according to the head-mounted display set forth in the first aspect, power adjusting regions having power set closer to the negative side than power at the optical centers, are set at outer sides of the optical centers of the virtual image forming optical systems in the directions orthogonal to the optical axes, and therefore, focal positions of the user in the case of the lateral view (positions where the user can clearly view the images) are extended to the far side, so that images positioned at peripheral portions of the screen of the display device can be more clearly viewed than in conventional cases. That is, a user can clearly view images displayed on a screen not only when viewing the images from the front view but also when viewing the images from the lateral view, and the range in which the user can clearly view the images can be expanded.

Here, the power adjusting regions include regions in which changes in power to the negative side toward the outer sides in the directions orthogonal to the optical axes (second aspect).

According to a head-mounted display set forth in a third aspect, in the head-mounted display set forth in either the first or second aspect, the virtual image forming optical systems are each configured by a combination lens including a first lens having power set positive, and a second lens separate from the first lens, including the power adjusting region, and disposed to overlap the first lens in an optical axis direction.

Here, the first lens includes a spherical design lens conventionally used for virtual image forming optical systems and an aspherical lens with constant power. That is, an effect equivalent to the effect of the first aspect is obtained by adding the second lenses to conventional virtual image forming optical systems.

In this case, an edge thickness of the second lens is set to be thicker compared to a spherical design lens whose power at the optical center and lens central thickness are equal to those of the second lens (fourth aspect).

According to a head-mounted display set forth in a fifth aspect, in the head-mounted display set forth in any of the first to sixth aspects, the virtual image forming optical systems are each configured by a single lens.

With this configuration, weight reduction is further realized compared to the case where the virtual image forming optical systems are each configured by a combination lens.

In this case, an edge thickness of the single lens is set to be thicker compared to a spherical design lens whose power at an optical center and lens central thickness are equal to those of the single lens (sixth aspect).

According to a head-mounted display set forth in a seventh aspect, in the head-mounted display set forth in either the first or second aspect, the display device has screens for the left eye and the right eye, for respectively displaying the images for the left eye and the right eye, and the head-mounted display further includes a half mirror for the left eye disposed at a side opposite to the screen for the left eye of the virtual image forming optical system for the left eye, ahead of the left eye of a user, and a half mirror for the right eye disposed at a side opposite to the screen for the right eye of the virtual image forming optical system for the right eye, ahead of the right eye of the user.

A virtual image forming lens set forth in an eighth aspect is a lens to be used for virtual image forming optical systems of a head-mounted display, and has positive power set in each region that a visual line of a user passes through, and includes a power adjusting region having power set closer to the negative side than power at an optical center at an outer side of the optical center in a direction orthogonal to an optical axis.

The virtual image forming lens set forth in this way in the eighth aspect is used for a head-mounted display and brings about an effect equivalent to the effect of the first aspect.

BRIEF DESCRIPTION OF DRAWINGS

FIG. 1 is a diagram showing a schematic configuration of an HMD for VR according to an embodiment of the present invention.

FIG. 7 are schematic configuration views of virtual image forming optical systems used in the image observation device in FIG. 6.

FIG. 8 are photos of images observed with the image observation device shown in FIG. 6.

FIG. 9 is a diagram showing a schematic configuration of an HMD for AR according to another embodiment of the present invention.

DESCRIPTION OF EMBODIMENTS

Figure 2A:
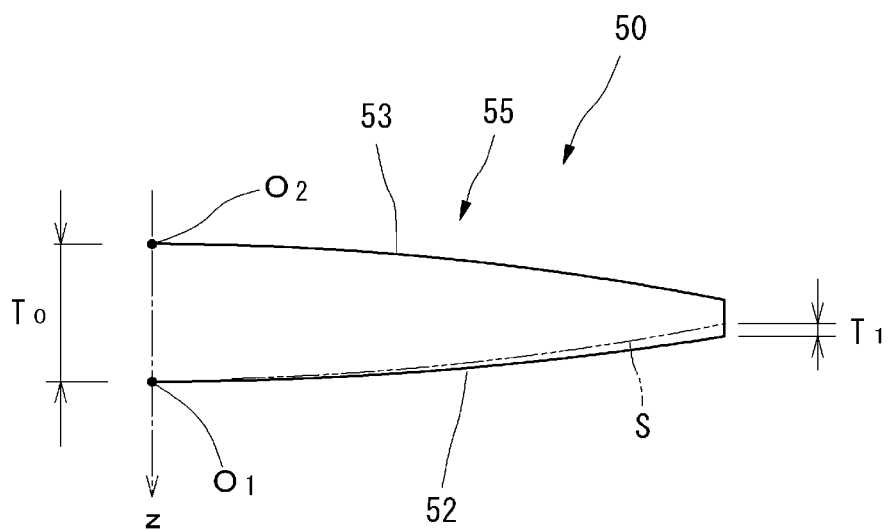
FIG. 2(A) is a schematic diagram showing a half of a virtual image forming lens of the HMD for VR according to the same embodiment.

Hereinafter, the present invention will be described through embodiments of the present invention, however, the following embodiments do not limit the inventions related to the scope of the claims. All of the combinations of features described in the embodiments are not always essential for solution means of the invention.

FIG. 1 shows an outline configuration of an HMD for VR (simply referred to as an HMD, unless otherwise confusing) according to a first embodiment. In FIG. 1 and other drawings, the left eye Ea and the right eye Eb of a user are arranged in an up-down direction of the drawings, and this direction is defined as a left-right direction, and the left-right direction of the drawings is defined as an anteroposterior direction. A reference line passing through the center between the left eye Ea and the right eye Eb and extending in the anteroposterior direction is defined as a centerline L, and reference lines respectively extending parallel to the centerline L from the left eye Ea and the right eye Eb are defined as main visual lines La and Lb. A separation distance between the left eye Ea and the right eye Eb of the user is defined as a separation distance P, and is provided by using, for example, an average separation distance between the left and right eyes of adults (typically 65 mm). The HMD 1 includes a frame 2, a display device 3, and virtual image forming optical systems 4a and 4b for the left eye and the right eye.

The frame 2 is a housing that holds the display device 3 and other components. A shape of the frame 2 may be an arbitrary shape as long as its front surface closes to hold the display device 3 inside, the back surface opens to allow a display surface (screen) of the display device 3 to be views from the back surface side, and side surfaces surround the circumference of the front surface so as to cover the surrounding of both eyes looking into the display device 3. In addition, a mounting band (not illustrated) to mount the HMD 1 to the front of the face of a user by being connected from one side surface of the frame 2 to the other side surface around the back of the user's head may be provided. The virtual image forming optical systems 4a and 4b for the left eye and the right eye are held inside the frame 2 so that the main visual lines La and Lb of the left eye Ea and the right eye Eb respectively overlap or substantially overlap the optical axes of the virtual image forming optical systems 4a and 4b for the left eye and the right eye in a state where a user wears the HMD 1.

The display device 3 is a device to display images 3a and 3b for the left eye and the right eye on a screen 3c. As the display device 3, for example, a flat panel display such as a liquid crystal display or an organic EL display, can be used. The display device 3 is held on the reverse side of the front surface of the frame 2 so that the screen 3c faces the back surface side. The screen 3c of the display device 3 includes two regions that are positioned on the main visual lines La and Lb of the left eye Ea and the right eye Eb and respectively display the images 3a and 3b for the left eye and the right eye. Instead of the display device 3 having a single screen 3c, two display devices that respectively display the images 3a and 3b for the left eye and the right eye may be used.

The virtual image forming optical systems 4a and 4b for the left eye and the right eye (also simply referred to as virtual image forming optical systems) are optical systems respectively disposed with respect to the images 3a and 3b for the left eye and the right eye on the screen 3c of the display device 3, and respectively form virtual images of the images 3a and 3b for the left eye and the right eye on virtual image display planes Va and Vb, and project magnified upright images of the virtual images on the left eye Ea and the right eye Eb. In the present embodiment, the virtual image forming optical systems 4a and 4b for the left eye and the right eye are each configured by a single virtual image forming lens 50, but may be configured by a combination of a plurality of lenses. The virtual image forming optical systems 4a and 4b for the left eye and the right eye are respectively disposed at the rear sides of two regions on the screen 3c in which the images 3a and 3b for the left eye and the right eye are respectively displayed.

When viewing the images 3a and 3b for the left eye and the right eye on the screen 3c with the left eye Ea and the right eye Eb through the respective virtual image forming optical systems 4a and 4b for the left eye and the right eye, virtual images of the images are respectively projected on the virtual image display planes Va and Vb. Here, when parallax images are provided as the images 3a and 3b for the left eye and the right eye, in an overlap region of the virtual image display planes Va and Vb, the virtual image on the virtual image display plane Va is viewed with the left eye Ea, and at the same time, the virtual image on the virtual image display plane Vb is viewed with the right eye Eb, and accordingly, the virtual images can be stereoscopically viewed inside a region As in which the overlap region is viewable from both eyes. That is, a stereoscopic image is projected inside the region As. In the regions on the virtual image display planes Va and Vb except for the overlap region, the virtual images cannot be binocularly viewed, so that, simply, the virtual image on the virtual image display plane Va is two-dimensionally viewed with the left eye Ea, and the virtual image on the virtual image display plane Vb is two-dimensionally viewed with the right eye Eb. That is, a stereoscopic image is not projected in the regions Am.

FIG. 2(A) shows a half of the lens (virtual image forming lens) 50 of the virtual image forming optical system 4a, 4b. The virtual image forming lens 50 of this example is a biconvex lens whose front surface (display device side) 53 and rear surface (eyeball side) 52 are both convex. The rear surface 52 is an aspherical convex surface defined by the following Equation (1), and the front surface 53 is a spherical convex surface defined by the following Equation (2). An axis in the anteroposterior direction, passing through an optical center O (basic point $O_1$ on the rear surface 52, basic point $O_2$ on the front surface 53) of the virtual image forming lens 50, is defined as the z-axis, and the z-axis matches an optical axis of the lens 50.

$$z = r^2/(R_1 + (R_1^2 - Kr^2)^{1/2}) + \delta \quad (1)$$

$$z = r^2/(R_2 + (R_2^2 - Kr^2)^{1/2}) \quad (2)$$

r in Equation (1) and Equation (2) is a distance from the z-axis. That is, considering an orthogonal coordinate system having an axis in the left-right direction and an axis in the vertical direction orthogonal to the z-axis, respectively set as an x-axis and a y-axis, and the basic point $O_1$ defined as a center on the rear surface 52 and the basic point $O_2$ defined as a center on the front surface 53, $r = (x^2 + y^2)^{1/2}$. $R_1$ and $R_2$ are curvature radiuses at apexes of the surfaces, and K (conic constant) is 1. In Equation (1) defining the rear surface 52, $\delta$ is an aspherical component expressed as $\Sigma\{A_n r^n\}$. Note that $A_n$: Aspherical coefficient, n: Positive integer. $\Sigma\{\ \}$ is a symbol showing a sum of members in $\{\ \}$. The above Equation (1) and Equation (2) can be applied to a lens having a meniscus shape by defining a direction toward the rear side of the lens as a positive direction of the z-axis, however, in the case of application to a rear surface of a biconvex lens as in this example, the sign of the z-axis is reversed.

For example, the aspherical component $\delta$ may be expressed as $A_4 r^4 + A_6 r^6 + A_8 r^8 + A_{10} r^{10}$, or may be expressed as $A_3 r^3$. An aspherical coefficient $A_n$ for identifying the aspherical component $\delta$ can be determined as needed through a simulation by ray tracing so that desired optical properties (changes in power) are obtained.

Figure 2B:
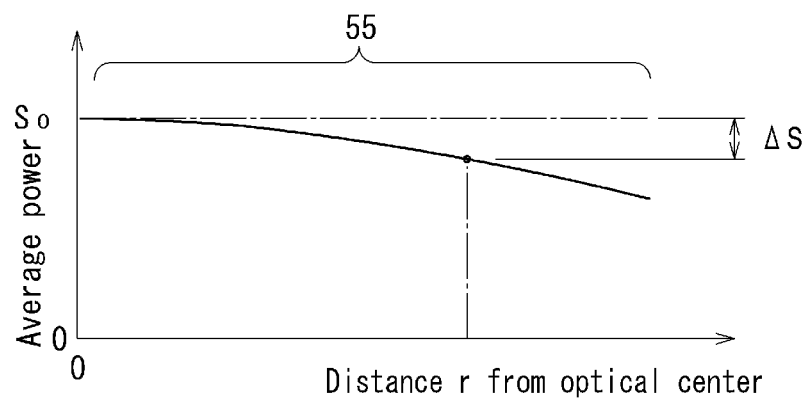
FIG. 2(B) is a diagram schematically showing changes in average power along a direction orthogonal to a lens optical axis in the same lens.

FIG. 2(B) is a diagram showing changes in power along a direction orthogonal to the optical axis of the virtual image forming lens 50 (specifically, changes in average power as an average of refractive power in the meridional direction and refractive power in the sagittal direction). Changes in power in the virtual image forming lens 50 can be measured by making a measurement light flux of a lens meter perpendicularly incident on the rear surface of the virtual image forming lens 50. Alternatively, in order to obtain optical properties reflecting a wearing state of the HMD 1, changes in power may be measured by using a lens meter capable of measuring optical properties of a lens to be inspected (virtual image forming lens 50) by using a center of rotation of the eye as a reference. Here, the average power is provided in units of diopter (Diopter [D]) which is a reciprocal of a distance expressed in meters.

As shown in FIG. 2(B), in the virtual image forming lens 50, positive power is set in each region of the lens (each region that a visual line of a user passes through). In addition, the virtual image forming lens 50 of this example has, at an outer side of the optical center O in a direction orthogonal to the optical axis, a power adjusting region 55 having power set closer to the negative side (in this example, a side where an absolute value of power becomes smaller) than power $S_0$ at the optical center. In this example, in the power adjusting region 55, changes in power to the negative side toward the outer side in the direction orthogonal to the optical axis.

Here, a change in power amount in the power adjusting region 55, specifically, an absolute value $\Delta S$ (refer to FIG. 2(B)) of a change in power amount with respect to the power $S_0$ at the optical center, preferably falls within the range of 0.10 to 3.00 D at a position 15 mm away from the optical center.

In the case of the virtual image forming lens 50 having the power adjusting region 55, a lens thickness is increased by a thickness corresponding to the aspherical component $\delta$ from a spherical surface with a curvature radius $R_1$ shown by an alternate long and two short dashed line in FIG. 2(A) (hereinafter, referred also as an original spherical surface, and represented by a sign S in FIG. 2(A)), and an amount of this increase in thickness becomes larger toward the edge of the lens. Here, an amount of increase in thickness at the edge of the lens is represented as $T_1$. That is, the virtual image forming lens 50 has a thicker lens edge thickness compared to a spherical design lens whose power $S_0$ at an optical center and lens central thickness $T_0$ are equal to those of the virtual image forming lens 50. The virtual image forming lens 50 having this form has a predetermined edge thickness that is maintained even when the lens central thickness is further reduced, and can be accordingly formed into a lens having a smaller lens central thickness than the spherical design lens. That is, a weight of the lens (in other words, a weight of the HMD) can be reduced.

In the HMD for VR according to the first embodiment configured as described above, the range in which a user can clearly view images can be expanded. FIG. 3(B) shows a relationship between a focal position and a screen 3c when a spherical design lens 50B (lens having two refractive surfaces both configured by spherical surfaces) is used for the virtual image forming optical system of the HMD for VR. As shown in this figure, when the spherical design lens 50B is used for the virtual image forming optical system, a focal position is set to assume a substantially circular form as shown by an alternate long and two short dashed line J. Therefore, when the visual line is further moved laterally for lateral view from a state (state of front view) where the eye of a user is focused on a central portion of the planar screen 3c spreading in front of the user, peripheral portions of the screen 3c are at more distant positions from the eye of a user than the central portion, so that gaps between the peripheral portions of the screen 3c and the focal position J where the user can clearly view images become large, and resolution of the images that the user view becomes lower.

Figure 3A:
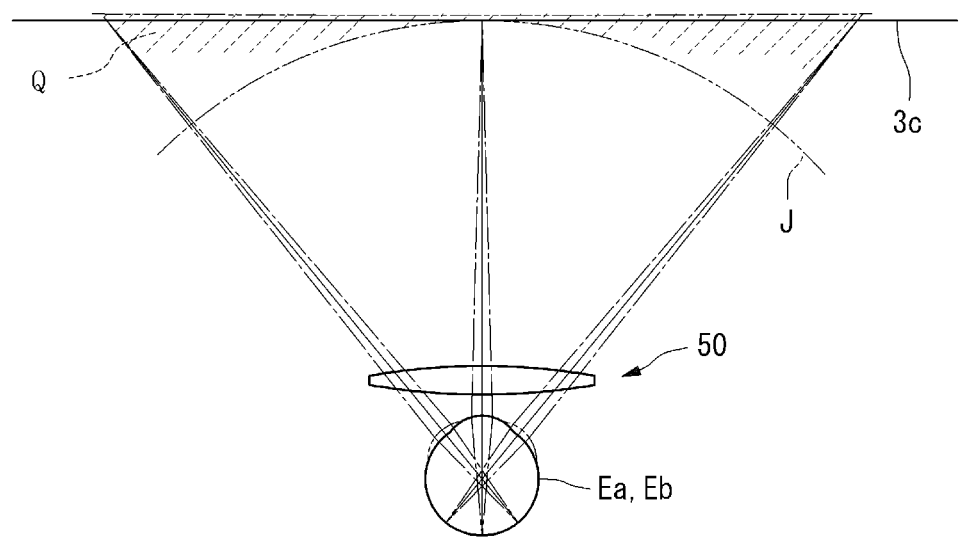
FIG. 3(A) is a diagram showing a relationship between a focal position and a screen in the HMD for VR of the same embodiment.
Figure 3B:
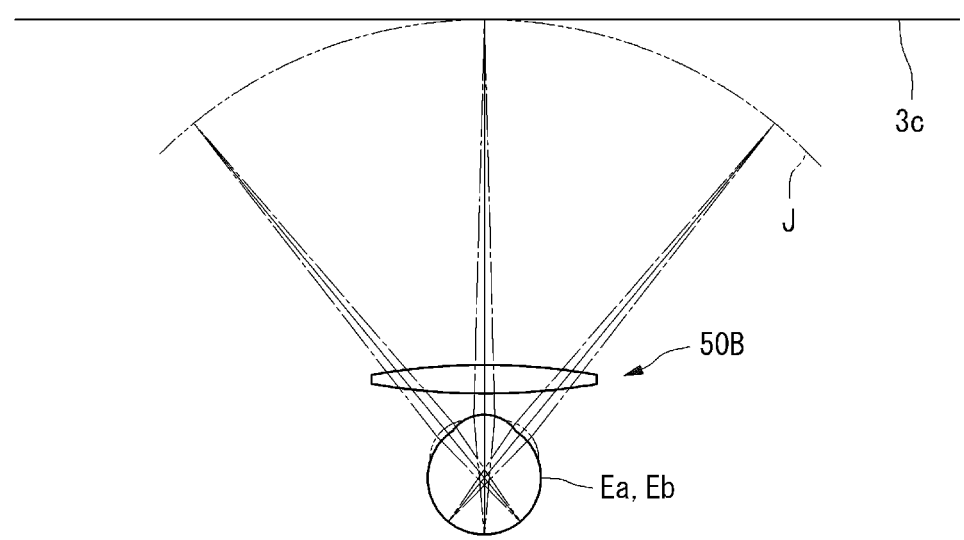
FIG. 3(B) is a diagram showing a relationship between a focal position and a screen when a spherical design lens is used as a virtual image forming optical system as a comparative example.

On the other hand, in the virtual image forming lens 50 having the power adjusting region 55, as shown in FIG. 3(A), the focal position Q moves to the farther side with a decreasing distance from an edge of the lens 50, so that even an image that is displayed at a peripheral portion of the screen 3c and viewed by lateral view can be clearly viewed.

Figure 4A:
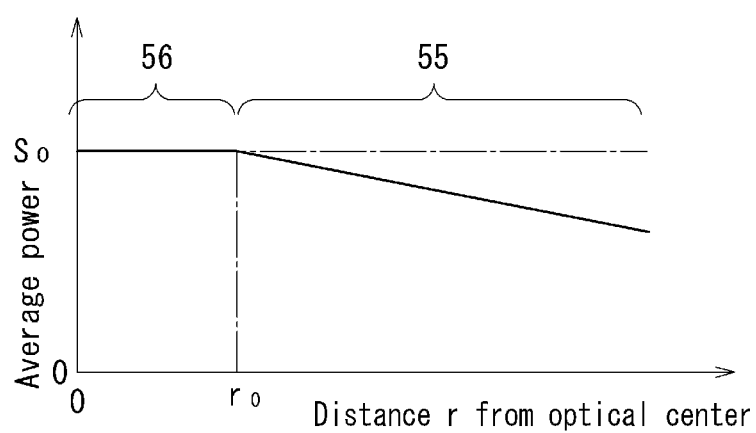
FIG. 4(A) is a diagram schematically showing changes in average power different from those in FIG. 2(B).
Figure 4B:
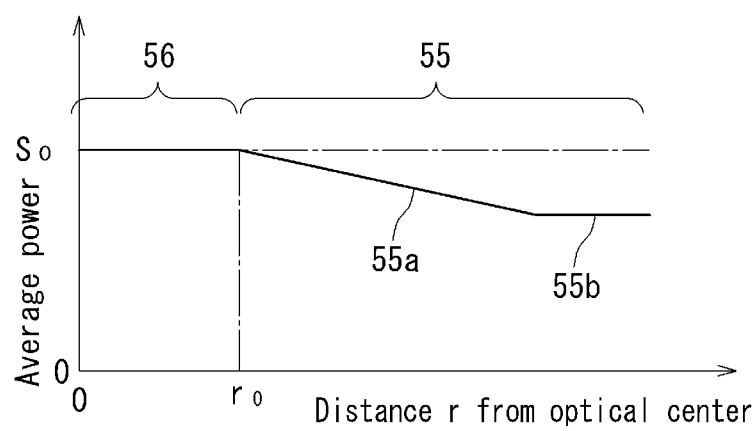
FIG. 4(B) is a diagram schematically showing changes in average power different from those in FIG. 4(A).

The virtual image forming lens 50 described above is configured by gradually changing power from the optical center O toward the lens edge as shown in FIG. 2(B), but the change in power pattern is not limited to this and can be changed as needed. For example, as shown in FIG. 4(A), it is also possible that power of a lens central portion 56 within a distance $r_0$ from the optical center O is defined as $S_0$, and a region at an outer side of the lens central portion 56 is set as a power adjusting region 55 whose power is changed closer to the negative side than $S_0$. It is also possible that, as shown in FIG. 4(B), the power adjusting region 55 includes, in addition to a region 55a whose changes in power to the negative side toward the outer side in a direction orthogonal to the optical axis, a region 55b in which predetermined power is maintained (power does not change).

In addition, the virtual image forming optical system 4a, 4b of the HMD 1 may be configured by combining a plurality of lenses instead of the single lens 50.

Figure 5:
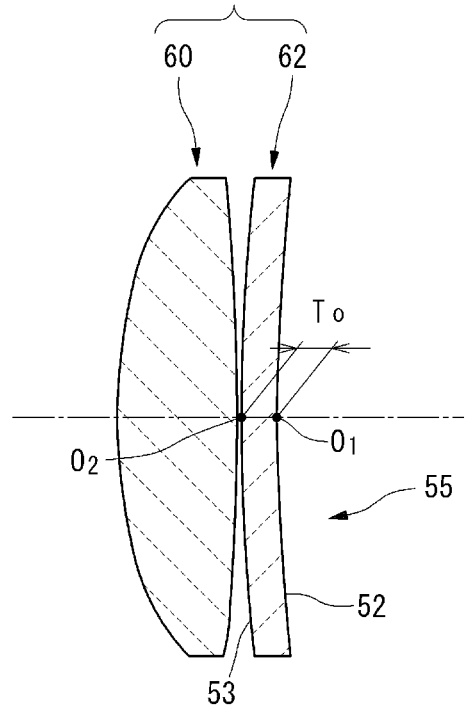
FIG. 5 is a schematic view of a virtual image forming optical system configured by a combination lens.

In an example shown in FIG. 5, the virtual image forming optical system 4a, 4b is configured by a combination lens of a first lens 60 and a second lens 62. The first lens 60 is a unifocal lens in which positive power $S_0$ is set. The second lens 62 has power of 0 D at an optical center O, and includes a power adjusting region 55 in which changes in power to the negative side (in this example, a side where an absolute value of power becomes larger) toward an edge of the lens at an outer side of an optical center O in a direction orthogonal to an optical axis.

In the second lens 62, an aspherical component δ is added to the rear surface 52, and a lens thickness is increased by a thickness corresponding to the aspherical component δ, and an amount of increase in thickness becomes larger with the decreasing distance from the edge of the lens. That is, the edge thickness of the second lens 62 is thicker compared to a spherical design lens whose power (0 D) at the optical center and lens central thickness $T_0$ are equal to those of the second lens 62.

These first lens 60 and second lens 62 are disposed so as to overlap each other in an optical axis direction so that their optical axes overlap or substantially overlap. Even in the case of using the combination lens configured in this way, an effect similar to the effect in the case of using the virtual image forming lens 50 can be obtained.

EXAMPLE

Figure 6:
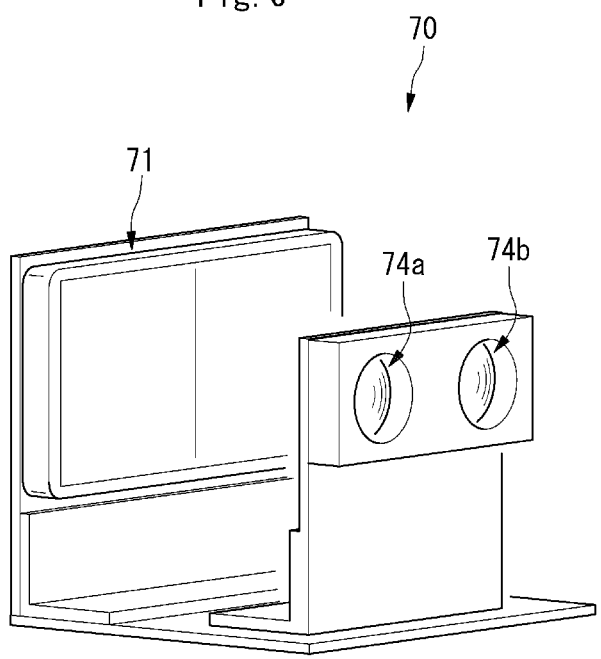
FIG. 6 is a view showing a schematic configuration of an image observation device used to check an effect of the present invention.
Figure 7A:
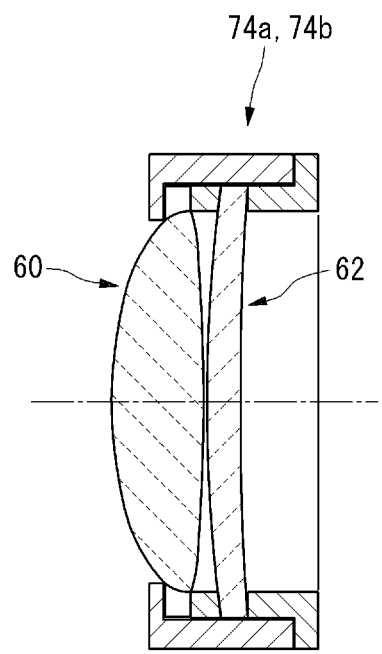
FIG. 7(A) shows a case where a combination lens consisting of a first lens and a second lens is used.
Figure 7B:
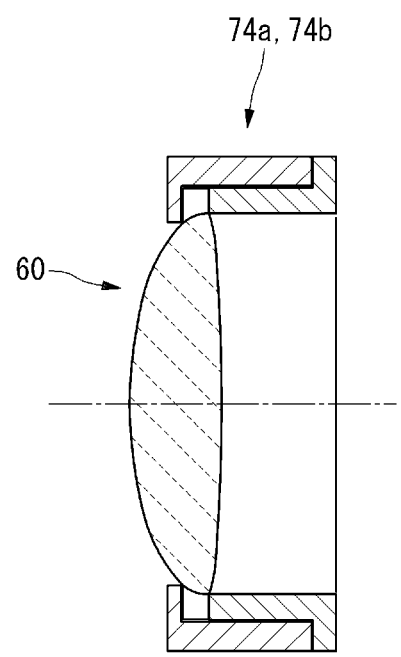
FIG. 7(B) shows a case where only a first lens is used.

In FIG. 6, 70 denotes an image observation device in which a display device 71 and virtual image forming optical systems 74a and 74b are disposed to face each other. By observing images displayed on the display device 71 through virtual image forming optical systems 74a and 74b in respective cases where, as each virtual image forming optical system 74a, 74b, the combination lens formed of the first lens 60 and the second lens 62 was used (refer to FIG. 7(A)), and where only the first lens 60 was used (refer to FIG. 7(B)), an effect of the use of the second lens 62 having the power adjusting region 55 was checked.

Here, as the first lens 60, a lens (φ 34 mm) for Google Cardboard (registered trademark) was used. A virtual image display distance is substantially 1000 mm from the first lens 60.

Specifications of the second lens 62 are as follows.

Refractive index: 1.608, Power at optical center: 0.00 D, Central thickness: 1.80 mm Change in power: Power was changed to −0.75 D at a position 15 mm outside from the optical center O in a direction orthogonal to an optical axis.

Other: A lens thickness at a position 25 mm outside from the optical center O in the direction orthogonal to the optical axis is 260 μm thicker than the spherical design lens.

As the display device 71, a smartphone (Google Pixel 3) was used.

Figure 8A:
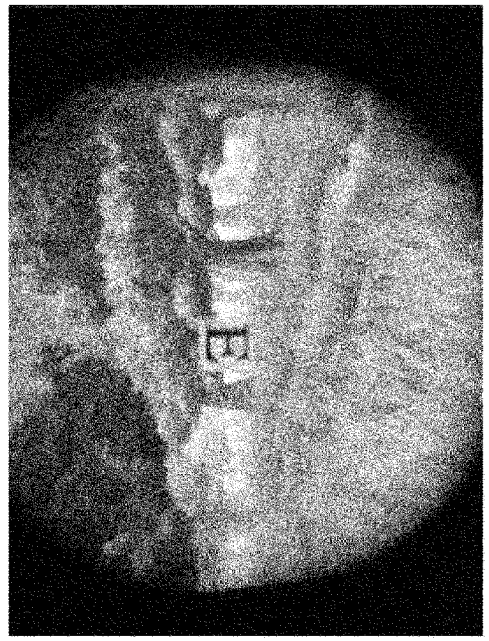
FIG. 8(A) shows a case where the virtual image forming optical system shown in FIG. 7(A) is used.
Figure 8B:
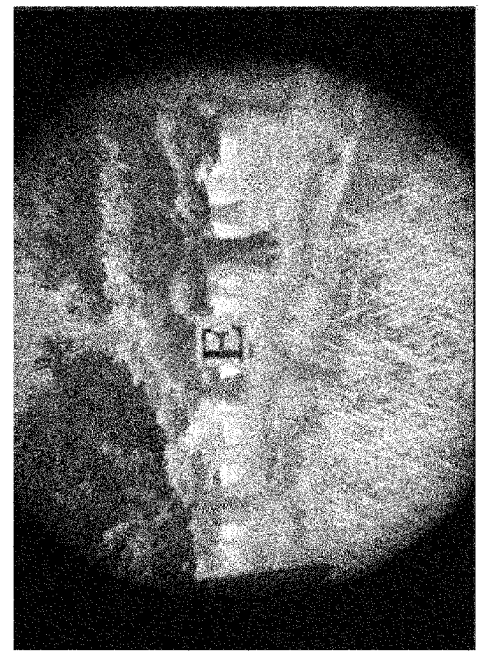
FIG. 8(B) shows a case where the virtual image forming optical system shown in FIG. 7(B) is used.

FIG. 8 are photos of images on the display device 71, observed with the image observation device 70. FIG. 8(A) shows an image when the first lens 60 and the second lens 62 were used as the virtual image forming optical system (refer to FIG. 7(A)). FIG. 8(B) shows an image when only the first lens 60 was used as the virtual image forming optical system (refer to FIG. 7(B)). Comparing FIG. 8(A) and FIG. 8(B), it is found that resolution of the image at a peripheral portion is higher in FIG. 8(A). In addition, comparing FIG. 8(A) and FIG. 8(B), it is found that an imaged range is wider. These are effects of the use of the second lens 62 having the power adjusting region 55 for the virtual image forming optical systems 74a, 74b.

FIG. 9 shows a schematic configuration of an HMD 11 for AR according to a second embodiment (simply referred to as HMD unless confusion arises). The HMD 11 includes a frame 12, display devices 13a and 13b for the left eye and the right eye, half mirrors 17a and 17b for the left eye and the right eye, and virtual image forming optical systems 4a and 4b for the left eye and the right eye. Among these components, components common to components of the HMD 1 according to the first embodiment are shown by using the same reference signs, and description thereof is omitted.

The frame 12 is a housing that holds the display devices 13a and 13b for the left eye and the right eye and other components. The frame 12 holds the display devices 13a and 13b for the left eye and the right eye inside left and right side surfaces, opens the back surface to allow the inside to be viewed from the back surface side, and has a transparent front surface so that, when the inside is viewed from the back surface side, the front side can be viewed, and holds the half mirrors 17a and 17b for the left eye and the right eye on main visual lines La and Lb of the left eye Ea and the right eye Eb so as to allow the screens of the display devices 13a and 13b for the left eye and the right eye to be viewed. The virtual image forming optical systems 4a and 4b for the left eye and the right eye are held inside the frame 12 so that, in a state where a user wears the HMD 11, the main visual lines La and Lb of the left eye Ea and the right eye Eb, respectively bent through the half mirrors 17a and 17b for the left eye and the right eye, respectively overlap or substantially overlap the optical axes $4a_0$ and $4b_0$ of the virtual image forming optical systems 4a and 4b for the left eye and the right eye.

The display devices 13a and 13b for the left eye and the right eye are devices to respectively display the images 3a and 3b for the left eye and the right eye on respective screens (also referred to as screens for the left eye and the right eye) of the display devices. As the display devices 13a and 13b, for example, flat panel displays such as liquid crystal displays and organic EL displays can be used. The display device 13a for the left eye is held inside the left side surface of the frame 12 so that its screen faces to the right. The display device 13b for the right eye is held inside the right side surface of the frame 12 so that its screen faces to the left.

The half mirrors 17a and 17b for the left eye and the right eye are respectively optical members to realize a see-through function that superposes and projects the images 3a and 3b for the left eye and the right eye and light from a target object ahead onto the left eye Ea and the right eye Eb by respectively reflecting the images 3a and 3b for the left eye and the right eye displayed on the screens of the display devices 13a and 13b for the left eye and the right eye and transmitting the light from the target object ahead. The half mirror 17a for the left eye is disposed at a side opposite to the screen for the left eye (display device 13a for the left eye) of the virtual image forming optical system 4a for the left eye, ahead of the user's left eye Ea (that is, on the main visual line La). The half mirror 17b for the right eye is disposed at a side opposite to the screen for the right eye (display device 13b for the right eye) of the virtual image forming optical system 4b for the right eye, ahead of the user's right eye Ea (that is, on the main visual line Lb).

The virtual image forming optical systems 4a and 4b for the left eye and the right eye are respectively disposed at the left side and the right side inside the frame 12 so as to face the screens of the display devices 13a and 13b for the left eye and the right eye, and form virtual images of the images 3a and 3b for the left eye and the right eye on virtual image display planes Va and Vb set ahead, and project magnified upright images of the virtual images on the left eye Ea and the right eye Eb.

When respectively viewing the images 3a and 3b for the left eye and the right eye on the screens of the display devices 13a and 13b for the left eye and the right eye with the left eye Ea and the right eye Eb through the half mirror 17a for the left eye and the virtual image forming optical system 4a for the left eye and the half mirror 17b for the right eye and the virtual image forming optical system 4b for the right eye, virtual images of these images are respectively projected on the virtual image display planes Va and Vb ahead. Here, when parallax images are provided as the images 3a and 3b for the left eye and the right eye, in an overlap region of the virtual image display planes Va and Vb, the virtual image on the virtual image display plane Va is viewed with the left eye Ea, and at the same time, the virtual image on the virtual image display plane Vb is viewed with the right eye Eb, and accordingly, in a region As in which the overlap region is viewable from both eyes, virtual images can be stereoscopically viewed to be superposed with a target object actually present in this region. That is, a stereoscopic image superposed with a target object inside the region As is projected.

In the HMD 11 according to the present embodiment, inside the frame 12, the display device 13a for the left eye and the virtual image forming optical system 4a for the left eye are disposed on the left of the half mirror 17a for the left eye on the main visual line La, but instead of this, may be disposed above or below the half mirror 17a for the left eye. In addition, in the HMD 11 according to the present embodiment, inside the frame 12, the display device 13b for the right eye and the virtual image forming optical system 4b for the right eye are disposed on the right of the half mirror 17b for the right eye on the main visual line Lb, but instead of this, may be disposed above or below the half mirror 17b for the right eye.

As described above, the HMD 11 according to the second embodiment includes the display devices 13a and 13b for the left eye and the right eye, configured to respectively display images 3a and 3b for the left eye and the right eye on screens, the virtual image forming optical systems 4a and 4b for the left eye and the right eye respectively disposed with respect to the images 3a and 3b for the left eye and the right eye, the half mirror 17a for the left eye disposed at a side opposite to the screen for the left eye of the virtual image forming optical system 4a for the left eye, ahead of the left eye Ea of a user, and the half mirror 17b for the right eye disposed at a side opposite to the screen for the right eye of the virtual image forming optical system 4b for the right eye, ahead of the right eye Eb of the user. In the virtual image forming lenses 50 used as the virtual image forming optical systems 4a and 4b, power adjusting regions 55 having power set closer to the negative side than power at the optical centers O are set at outer sides of the optical centers O in the directions orthogonal to the optical axes, so that focal positions at the time of lateral view are extended to the far side, and the images positioned on peripheral portions of the screens of the display devices 13a and 13b can be clearly viewed. That is, images displayed on the screens of the display devices 13a and 13b can be clearly viewed not only by the front view but also by the lateral view, and the range in which the user can clearly view images can be expanded.

In the HMD 11 according to the second embodiment, the half mirrors 17a and 17b for the left eye and the right eye are used to realize a see-through function, however, instead of these, a planar waveguide and a holographic optical element may be used in combination for reduction in size of the device.

In the HMDs 1 and 11 according to the first and second embodiments, the images 3a and 3b for the left eye and the right eye displayed by the display device 3 and the display devices 13a and 13b for the left eye and the right eye may be color images or black-and-white images. When they are color images, each of the HMDs may further include an optical system to correct chromatic aberration.

Other Modifications and Application Examples

The power adjusting region of the virtual image forming optical system may be provided across the entire circumference around the optical axis of the virtual image forming optical system, or may be provided only at a portion in the circumferential direction.

The virtual image forming lens of the embodiment described above has a biconvex shape, but may be formed to have a plano-convex or meniscus shape, and depending on circumstances, a Fresnel shape may be employed for reducing the lens thickness.

The embodiment described above is an example in which an aspherical component δ for changing power is added to the virtual image forming lens or the rear surface of the second lens, however, it is also possible that an aspherical component δ is added to the front surface of the lens or added to both of the front surface and the rear surface.

REFERENCE SIGNS LIST

1 Head-mounted display (HMD for VR)
3, 13a, 13b Display device
3a Image for left eye
3b Image for right eye
3c Screen
4a, 4b Virtual image forming optical system
11 Head-mounted display (HMD for AR)
17a Half mirror for left eye
17b Half mirror for right eye
50 Virtual image forming lens
52 Rear surface
53 Front surface
55 Power adjusting region
60 First lens
62 Second lens
Ea Left eye
Eb Right eye
δ Aspherical component

The invention claimed is:

1. A head-mounted display comprising:
a display device to display images for the left eye and the right eye on a screen; and
virtual image forming optical systems for the left eye and the right eye respectively disposed with respect to the images for the left eye and the right eye on the screen,
wherein the virtual image forming optical systems have positive power set in respective regions that visual lines of a user pass through, and include, at outer sides of optical centers in directions orthogonal to respective optical axes, power adjusting regions having power set closer to the negative side than power at the optical centers,
wherein the power in the power adjusting regions changes more to the negative side toward the outer sides in the directions orthogonal to the respective optical axes, and
wherein absolute value of a change in amount of power with respect to the power at the optical centers in the power adjusting regions falls within a range of 0.10 to 3.00 units of diopter (D) at a position 15 mm away from the optical centers.

2. The head-mounted display according to claim 1, wherein
the virtual image forming optical systems are each configured by a combination lens including
a first lens having power set positive, and
a second lens separate from the first lens, including the power adjusting region, and disposed to overlap the first lens in an optical axis direction.

3. The head-mounted display according to claim 2, wherein an edge thickness of the second lens is set to be thicker compared to a spherical design lens whose power at the optical center and lens central thickness are equal to those of the second lens.

4. The head-mounted display according to claim 3, wherein
the display device has screens for the left eye and the right eye, for respectively displaying the images for the left eye and the right eye, and
the head-mounted display further comprising:
a half mirror for the left eye disposed at a side opposite to the screen for the left eye of the virtual image forming optical system for the left eye, ahead of the left eye of a user; and
a half mirror for the right eye disposed at a side opposite to the screen for the right eye of the virtual image forming optical system for the right eye, ahead of the right eye of the user.

5. The head-mounted display according to claim 2, wherein
the display device has screens for the left eye and the right eye, for respectively displaying the images for the left eye and the right eye, and
the head-mounted display further comprising:
a half mirror for the left eye disposed at a side opposite to the screen for the left eye of the virtual image forming optical system for the left eye, ahead of the left eye of a user; and
a half mirror for the right eye disposed at a side opposite to the screen for the right eye of the virtual image forming optical system for the right eye, ahead of the right eye of the user.

6. The head-mounted display according to claim 1, wherein the virtual image forming optical systems are each configured by a single lens.

7. The head-mounted display according to claim 6, wherein an edge thickness of the single lens is set to be thicker compared to a spherical design lens whose power at an optical center and lens central thickness are equal to those of the single lens.

8. The head-mounted display according to claim 7, wherein
the display device has screens for the left eye and the right eye, for respectively displaying the images for the left eye and the right eye, and
the head-mounted display further comprising:
a half mirror for the left eye disposed at a side opposite to the screen for the left eye of the virtual image forming optical system for the left eye, ahead of the left eye of a user; and
a half mirror for the right eye disposed at a side opposite to the screen for the right eye of the virtual image forming optical system for the right eye, ahead of the right eye of the user.

9. The head-mounted display according to claim 6, wherein
the display device has screens for the left eye and the right eye, for respectively displaying the images for the left eye and the right eye, and
the head-mounted display further comprising:
a half mirror for the left eye disposed at a side opposite to the screen for the left eye of the virtual image forming optical system for the left eye, ahead of the left eye of a user; and
a half mirror for the right eye disposed at a side opposite to the screen for the right eye of the virtual image forming optical system for the right eye, ahead of the right eye of the user.

10. The head-mounted display according to claim 1, wherein
the display device has screens for the left eye and the right eye, for respectively displaying the images for the left eye and the right eye, and the head-mounted display further comprising:

a half mirror for the left eye disposed at a side opposite to the screen for the left eye of the virtual image forming optical system for the left eye, ahead of the left eye of a user; and a half mirror for the right eye disposed at a side opposite to the screen for the right eye of the virtual image forming optical system for the right eye, ahead of the right eye of the user.

11. The head-mounted display according to claim 1, wherein the absolute value of a change in the amount of power with respect to the power at the optical center in the power adjustment regions falls within the range of 0.75 to 3.00 units of diopter (D) at a position 15 mm away from the optical center.

12. A virtual image forming lens to be used for virtual image forming optical systems of a head-mounted display having positive power set in each region that a visual line of a user passes through, comprising: a power adjusting region having power set closer to the negative side than power at an optical center at an outer side of the optical center in a direction orthogonal to an optical axis of the image forming lens, wherein the power in the power adjusting region changes more to the negative side toward the outer side in the direction orthogonal to the optical axis, wherein absolute value of a change in amount of power with respect to the power at the optical center in the power adjusting region falls within a range of 0.10 to 3.00 units of diopter (D) at a position 15 mm away from the optical center.

13. The virtual image forming lens according to claim 12, wherein the absolute value of a change in the amount of power with respect to the power at the optical center in the power adjustment regions falls within the range of 0.75 to 3.00 units of diopter (D) at a position 15 mm away from the optical center.

* * * * *